United States Patent [19]

Saito et al.

[11] Patent Number: 4,808,636

[45] Date of Patent: Feb. 28, 1989

[54] PROCESS FOR PRODUCING POLYURETHANE ELASTOMER AND COMPOSITION AS STARTING MATERIAL THEREFOR

[75] Inventors: Joichi Saito; Hiroshi Wada, both of Yokohama; Shigehito Shibata, Sagamihara; Takashi Watabe, Yokohama; Kiyoshi Tanabe, Yokohama; Nobuaki Kunii, Yokohama, all of Japan

[73] Assignee: Asahi Glass Company Ltd., Tokyo, Japan

[21] Appl. No.: 184,671

[22] Filed: Apr. 22, 1988

[30] Foreign Application Priority Data

Apr. 24, 1987 [JP] Japan ................................. 62-100093
Sep. 14, 1987 [JP] Japan ................................. 62-228444

[51] Int. Cl.$^4$ ............................................. C08G 18/14
[52] U.S. Cl. ..................................... 521/163; 264/51; 264/328.1; 264/328.6; 264/328.8; 521/164; 521/167; 528/76; 528/77
[58] Field of Search .................... 264/51, 328.1, 328.6, 264/328.8; 521/163, 164, 167; 528/76, 77

[56] References Cited

U.S. PATENT DOCUMENTS 4,269,945  5/1981  Vanderhider et al. ............. 521/159
4,296,212  10/1981 Ewen et al. ........................ 521/163
4,530,941  7/1985  Turner et al. ...................... 528/76
4,659,747  4/1987  Alberino et al. ................... 528/76

FOREIGN PATENT DOCUMENTS 9698  5/1980  European Pat. Off. .

*Primary Examiner*—Maurice J. Welsh

*Attorney, Agent, or Firm*—Oblon, Fisher, Spivak, McClelland & Maier

[57] ABSTRACT

A process for producing a shaped article of a non-cellular or microcellular polyurethane elastomer by reaction injection molding by using a high molecular weight active hydrogen compound component (A), a chain extender component (B) and a polyisocyanate compound component (C) as starting materials, wherein (I) the high molecular weight active hydrogen compound component (A) comprises
   (1) at least one polyoxyalkylene polyol (a-1) having an average molecular weight per hydroxyl group of from 800 to 4000 and an average number of hydroxyl groups per molecule of from 2 to 8 and containing at least 5% by weight of oxyethylene groups at the terminal portions of its molecules,
   (2) a high molecular weight amine (a-2) having from 2 to 8 active hydrogen-containing groups, and optionally
   (3) a high molecular weight polyol (a-3) other than the polyalkylene polyol (a-1), and
(II) the chain extender component (B) comprises
   (1) a low molecular weight polyol (b-1) having from 2 to 4 hydroxyl groups and a molecular weight of at most 400,
   (2) at least one diamine (b-2) selected from aromatic and alicyclic compounds and having two primary amino groups and no amino group directly bonded to an aromatic ring, and optionally
   (3) a chain extender (b-3) other than the constituents (b-1) and (b-2), having from 2 to 4 active hydrogen-containing groups.

20 Claims, No Drawings

PROCESS FOR PRODUCING POLYURETHANE ELASTOMER AND COMPOSITION AS STARTING MATERIAL THEREFOR

The present invention relates to a process for producing a non-cellular or microcellular polyurethane elastomer by reaction injection molding, and a composition useful as the starting material for the process.

It is well known to produce a shaped product of a synthetic resin by reaction injection molding. The reaction injection molding is widely used particularly for the production of polyurethane resins such as polyurethane urea elastomers. Its application to synthetic resins other than polyurethane resins is also known. For instance, its application to polyamide resins, epoxy resins and unsaturated polyester resins has been studied, and a part thereof has been put in practice. The reaction injection molding is a molding method which essentially comprises mixing at least two flowable starting components capable of rapidly reacting when mixed to form a synthetic resin, immediately injecting the mixture into a mold and forming the synthetic resin in the mold. The mixing of the flowable starting components is usually conducted by impingement mixing. Further, in order to conduct uniform mixing, it is common to inject the mixture to the mold through an after-mixing mechanism. A mixture of at least two flowable starting components will be referred to as a reactive mixture hereinafter.

It is known to produce a polyurethane type elastomer such as polyurethane elastomer or polyurethane urea elastomer by reaction injection molding by using at least two components i.e. a starting material component containing a polyisocyanate and another starting material component comprising a high molecular weight active hydrogen compound such as a polyol having a relatively high molecular weight and a chain extender and optionally having a catalyst or a foaming agent incorporated. A typical example of such a high molecular weight active hydrogen compound is a polyol having a relatively high molecular weight, particularly a polyetherpolyol. The chain extender is a polyhydric alcohol or polyamine having a relatively low molecular weight, which is also a kind of an active hydrogen-containing compound. It is usually necessary to use a catalyst, and the catalyst is usually added to the starting material component containing the active hydrogen compound, but it may be added to the starting material component containing the isocyanate compound. It is common to produce a microcellular polyurethane type elastomer by using a small amount of a foaming agent such as a halogenated hydrocarbon foaming agent for the purpose of improving the moldability. The density of such a microcellular polyurethane type elastomer obtained by using a small amount of the foaming agent is usually at least about 0.8 g/cm$^3$, particularly at least 0.9 g/cm$^3$. Unless a large amount of a reinforcing fiber, a flake filler or a powder filler is incorporated, the upper limit is usually at most 1.2 g/cm$^3$, particularly at most 1.15 g/cm$^3$. Likewise, the density of a non-cellular polyurethane type elastomer is also usually within the above range. It is also known to conduct reaction injection molding by dividing the starting material component containing the active hydrogen compound into two or more portions and using a total of three or more components including the starting material component containing the isocyanate compound.

It is well known to use an alkyl-substituted aromatic diamine such as diethyltolylenediamine as a chain extender for the production of a polyurethane urea elastomer by reaction injection molding (U.S. Pat. No. 4,218,543). Further, U.S. Pat. No. 4,269,945 discloses the use of an aliphatic polyamine as a chain extender. On the other hand, it is also known to produce a polyurethane urea elastomer or a polyurea elastomer by using a polyamine having a high molecular weight as a high molecular weight active hydrogen compound (European Patent No. 81,701). By the use of an amine type chain extender, the activity of the reactive mixture increases, and the curing is facilitated. The activity of the reactive mixture is further improved by the combination of the amine type chain extender and the high molecular weight polyamine, whereby the curing is remarkably facilitated. Such a highly active system has a merit that the molding time of the polyurethane urea elastomer can be shortened. Further, by the highly active system, it is possible to reduce voids formed in a shaped product. With a low activity system using a high molecular weight polyol and a polyol chain extender, the formation of voids in the shaped product is quite substantial.

In such a highly active system, however, a problem specific to the high activity may occur. Namely, when the size of the molded product is large relative to the injection capacity of the injection molding machine, the fluidity of the injected reaction mixture will be lost before the mixture completely fill the mold cavity, thus resulting in a problem of inadequate packing. For instance, when a molded product of $W_1$kg is produced by an injection molding machine with an injection capacity of $W_0$kg per second, the injection time is $W_1/W_0$ seconds. On the other hand, when the period of time from the time when all the reactive starting materials are mixed by the injection molding machine to the time when the fluidity of the reactive mixture is lost is represented by $t_0$ seconds, this $t_0$ must be longer than the injection time of $W_1/W_0$ seconds. Otherwise, the first injected portion of the reactive mixture will lose its fluidity during its flow in the mold cavity, whereby the down stream portion of the mold cavity will not be filled with the reactive mixture. With the above-mentioned highly active system, $t_0$ is extremely short. Accordingly, when $W_1$ is large as compared with $W_0$, $t_0$ is likely to be shorter than $W_1/W_0$, whereby proper molding will be impossible.

It is expected that the above problem can be solved by adjusting the activity of the high molecular weight active hydrogen compound or the chain extender to a level lower than the highly active system and higher than the low activity system. As such a moderately active system, a combination of an amine chain extender and a greater amount of a polyol chain extender is conceivable. For instance, U.S. Pat. No. 4,296,212 discloses a system wherein a combination of at least 55% by weight of a polyol chain extender and at most 45% by weight of an alkyl-substituted aromatic diamine is used as the chain extender. Further, U.S. Pat. No. 4,269,945 discloses a combination of a polyol chain extender and an aliphatic polyamine chain extender. Furthermore, Japanese Unexamined Patent Publication No. 190518/1986 discloses a system comprising a high molecular weight polyol, a high molecular weight or low molecular weight polyether polyamine, a polyol chain extender and an aromatic diamine chain extender. However, in these systems, the formation of voids increases as the activity lowers, and they are disadvantageous from the desirability of suppressing the formation of voids.

It is accordingly an object of the present invention to provide a moderately active system whereby the formation of voids can be suppressed.

The present invention provides a process for producing a shaped article of a non-cellular or microcellular polyurethane elastomer by reaction injection molding by using a high molecular weight active hydrogen compound component (A), a chain extender component (B) and a polyisocyanate compound component (C) as starting materials, wherein the component (A) is used in an amount of from 55 to 95% by weight based on the total amount by weight of the components (A) and (B), the component (B) is used in an amount of from 5 to 45% by weight based on the total amount by weight of the components (A) and (B), and the component (C) is used in an amount of from 0.8 to 1.3 times in equivalent relative to the total equivalent of the components (A) and (B), and wherein (I) said high molecular weight active hydrogen compound component (A) comprises
  (1) at least one polyoxyalkylene polyol (a-1) having an average molecular weight per hydroxyl group of from 800 to 4000 and an average number of hydroxyl groups per molecule of from 2 to 8 and containing at least 5% by weight of oxyethylene groups at the terminal portions of its molecules,
  (2) a high molecular weight amine (a-2) having from 2 to 8 active hydrogen-containing groups selected from the group consisting of primary amino groups, secondary amino groups and hydroxyl groups, provided that at least one of the active hydrogen-containing groups is an amino group selected from the group consisting of primary amino groups and secondary amino groups, and an average molecular weight per active hydrogen-containing group of from 800 to 4000, and optionally
  (3) a high molecular weight polyol (a-3) other than the polyalkylene polyol (a-1),
  wherein the total number of the primary amino groups and the secondary amino groups is from 2 to 55% based on the total number of the active hydrogen-containing groups in the constituents (a-1), (a-2) and (a-3), and the constituent (a-3) is in an amount of from 0 to 30% by weight based on the total amount by weight of the constituents (a-1), (a-2) and (a-3); and (II) said chain extender component (B) comprises
  (1) a low molecular weight polyol (b-1) having from 2 to 4 hydroxyl groups and a molecular weight of at most 400,
  (2) at least one diamine (b-2) selected from aromatic and alicyclic compounds and having two primary amino groups and no amino group directly bonded to an aromatic ring, and optionally
  (3) a chain extender (b-3) other than the constituents (b-1) and (b-2), having from 2 to 4 active hydrogen-containing groups selected from the group consisting of primary amino groups, secondary amino groups and hydroxyl groups and a molecular weight of at most 400,
  wherein the constituent (b-1) is in an amount of from 55 to 98% by weight based on the total amount by weight of the constituents (b-1), (b-2) and (b-3), the constituent (b-2) is in an amount of from 2 to 35% by weight based on the total amount by weight of the constituents (b-1), (b-2) and (b-3), and the constituent (b-3) is in an amount of from 0 to 40% by weight based on the total amount by weight of the constituents (b-1), (b-2) and (b-3).

Namely, in the present invention, a high molecular weight polyol and an amino group-containing high molecular weight active hydrogen compound are used as essential constituents of the high molecular weight active hydrogen compound component (A), and a polyol chain extender and a diamine having an aliphatic primary amino group are used as essential constituents of the chain extender component (B). An amino group has a higher activity to an isocyanate group than a hydroxyl group. Accordingly, in the present invention, the viscosity of the reactive mixture increases rapidly at the initial stage and relatively slowly at the subsequent stage. Because, at the initial stage, amino groups rapidly react with isocyanate groups, and at the later stage, hydroxyl groups react relatively slowly with isocyanate groups. This characteristic curve in the increase of the viscosity of the reactive mixture serves to suppress the formation of voids and at the same time solve the abovementioned problem of inadequate packing. Namely, the formation of voids is little because the reactive mixture flows in the mold cavity with a viscosity higher than that of the low activity system, and the possibility of inadequate packing is less because the fluidity is maintained for a long period of time as compared with the highly active system. Further, as compared with the conventional moderately activ system, the initial increase of the viscosity is rapid because a part of the high molecular weight active hydrogen compound component (A) has amino groups and the activity of the diamine chain extender is high, whereby the formation of voids is less.

Now, the present invention will be described in detail with reference to the preferred embodiments.

The polyoxyalkylene polyol (a-1) in the present invention is a polyoxyalkylene polyol commonly employed for the production of a polyurethane type elastomer by reaction injection molding. This constituent (a-1) may be a mixture of two or more polyoxyalkylene polyols. Inclusive of such a mixture, this constituent (a-1) has an average molecular weight per hydroxyl group of from 800 to 4000, preferably from 1200 to 3500. The average number of hydroxyl groups per molecule is from 2 to 8, preferably from 2 to 4. This polyoxyalkylene polyol is produced by adding an alkylene oxide to a polyvalent initiator. As such an alkylene oxide, at least one of propylene oxide and butylene oxide, and ethylene oxide are preferably employed. It is particularly preferred to employ propylene oxide and ethylene oxide. This polyether polyol should contain hydroxyl groups having a high reactivity i.e. a high proportion of primary hydroxyl groups. For this purpose, the polyether polyol contains oxyethylene groups at the terminal portions of its molecules. Such a polyoxyalkylene polyol can be obtained by adding propylene oxide or butylene oxide to a polyvalent initiator, followed by addition of ethylene oxide. Oxyethylene groups may be present not only at the terminal portions of the molecular chains but also at the internal portions of the molecular chains. The amount of the oxyethylene groups present at the terminal portions of the molecules is at least 5% by weight, preferably at least 8% by weight. The higher the content of the oxyethylene groups in the polyoxyalkylene polyol the higher the hydrophilic nature of the resulting polyurethane elastomer. In the case of shaped products to be used outdoors, such as external shell structures of automotive bumpers, it is not desirable that the hydrophilic nature is high, because the dimensional stability will be low due to absorption of water. In such a case, the total content of oxyethylene groups in the polyoxyalkylene polyol inclusive of internal oxyethylene groups is preferably at most 35% by weight, more preferably at most 25% by weight. In such a case, it is preferred that the majority of the oxyethylene groups are present at the terminal portions of the molecular chains. However, in an application where the hydrophilic nature of the polyurethane urea elastomer is not required to be low, the upper limit of the oxyethylene groups is not limited as specified above.

The polyvalent initiator which may be used for the preparation of the above-mentioned polyoxyalkylene polyol includes polyhydric alcohols, polyhydric phenols, polyamines and alkanolamines. For example, it includes ethylene glycol, diethylene glycol, propylene glycol, dipropylene glycol, neopentyl glycol, 1,4-butanediol, 1,6-hexanediol, glycerol, trimethyrol propane, penta erythritol, diglycerol, dextrose, sucrose, biphenol A and ethylene diamine. These initiators may be used alone or in combination as a mixture of two or more. A particularly preferred polyvalent initiator is a polyhydric alcohol. A desired polyoxyalkylene polyol is obtained by adding at least one alkylene oxide having at least 3 carbon atoms such as propylene oxide or 1,2- or 2,3-butylene oxide to such a polyvalent initiator, followed by adding ethylene oxide. A polyoxyalkylene polyol having internal oxyethylene groups can be obtained by sequentially or simultaneously adding ethylene oxide and an alkylene oxide having at least 3 carbon atoms to a polyvalent initiator and finally adding ethylene oxide thereto.

The polyoxyalkylene polyol (a-1) in the present invention may contain a polymer of a monomer having an $\alpha,\beta$-unsaturated group. Such a polymer-containing polyoxyalkylene polyol is called a polymer/polyol and can be prepared, for example, by polymerizing a monomer such as acrylonitrile or styrene in the polyoxyalkylene polyol. The polymer is dispersed in the form of fine particles in the polyoxyalkylene polyol, and it is usually dispersed under a stabilized condition in the polyoxyalkylene polyol. The amount of the polymer in the polymer-containing polyol is usually not higher than 40% by weight, preferably from 5 to 30% by weight. This polymer-containing polyoxyalkylene polyol has an overall hydroxyl value of not higher than 60, preferably from 15 to 40.

The high molecular weight amine (a-2) in the present invention is a high molecular weight active hydrogen compound having at least two active hydrogen-containing groups selected from the groups consisting of primary amino groups, secondary amino groups and hydroxyl groups, provided that at least one of the active hydrogen-containing groups is a primary amino group or a secondary amino group. Hereinafter, the term "amino group" means this primary or secondary amino group unless otherwise specified. The substitutent R in the secondary amino group of the formula -NHR is an alkyl group, preferably a $C_1$–$C_4$ alkyl group. Further, the proportion of amino groups means the proportion of the number of amino groups to the total number of active hydrogen-containing groups. The high molecular weight amine (a-2) in the present invention may be a mixture of two or more high molecular weight amines. Inclusive of such a mixture, the molecular weight per active hydrogen-containing group of the constituent (a-2) is from 800 to 4000. The higher the molecular weight, the better the physical properties of the resulting elastomer and the less the formation of voids. Accordingly, a preferred lower limit of this molecular weight is 1100, more preferably 1200. The upper limit of the molecular weight is preferably 3500. The average number of the active hydrogen-containing groups per molecule of this high molecular weight amine (a-2) is from 2 to 8, preferably from 2 to 4.

The high molecular weight amine (a-2) is a known compound and is disclosed, fcr example, in European Pat. No. 81,701 or the references cited therein. A preferred high molecular weight amine is a high molecular weight amine having a polyoxyalkylene chain. Such a polyoxyalkylene amine can be obtained by converting a part or whole of the hydroxyl groups of the above-mentioned polyoxyalkylene polyol to amino groups. Otherwise, it can be obtained by reacting a polyoxyalkylene polyol with a polyisocyanate compound and reacting the isocyanate groups of the resulting isocyanate terminal prepolymer with water to convert them to amino groups. Further, it may be obtained by reacting an amino group-containing carboxylic acid or its reactive derivative to a polyoxyalkylene polyol. A preferred high molecular weight amine is a polyoxyalkylene amine obtained by reacting a polyoxyalkylene polyol with ammonia or an amine, or a polyoxyalkylene amine obtained by reacting a polyoxyalkylene polyol with an unsaturated nitrile such as acrylonitrile, followed by hydrogenation. Particularly preferred is a polyoxyalkylene polyamine having a relatively high proportion of amino groups obtained by converting hydroxyl groups of a polyoxyalkylene polyol to primary amino groups. As such a polyoxyalkylene polyol, a polyoxyalkylene polyol having secondary or tertiary hydroxyl groups is preferred. It is particularly preferred to use a polyoxyalkylene polyol having an oxyalkylene group having at least 3 carbon atoms, particularly an oxypropylene group. This polyoxyalkylene polyol may contain oxyethylene groups in the molecular chain.

There is no particular restriction as to the proportion of amino groups in the high molecular weight amine. In the case of a polyoxyalkylene amine obtained by converting hydroxyl groups of a polyoxyalkylene polyol to amino groups, so long as it has at least one amino group, the lower limit of the proportion of amino groups is $100/n$ %, wherein n is the number of hydroxyl groups of the polyoxyalkylene polyol. Accordingly, a polyoxyalkylene amine having a proportion of amino groups of less than $100/n$ % is considered to be a mixture comprising a polyoxyalkylene amine having a proportion of amino groups of $100/n$ % or higher and a polyoxyalkylene polyol. In the present invention, such a polyoxyalkylene polyol is regarded as a kind of the above-mentioned polyoxyalkylene polyol (a-1). Accordingly, for instance, a polyoxyalkylene amine obtained by converting 10% of the total hydroxyl groups of a polyoxyalkylene polyol having a molecular weight of 200 per hydroxyl group to amino groups, is considered to be a mixture of a polyoxyalkylene polyol (a-1) and a high molecular weight polyamine (a-2). However, the proportion of amino groups in the high molecular weight polyamine (a-2) is preferably at least 50%, more preferably at least 70%.

In the present invention, the high molecular weight polyol (a-3) other than the above polyoxyalkylene polyol (a-1) is an optional constituent, and its incorporation is not essential. However, it may be employed for the purpose of improving the physical properties of a polyurethane urea elastomer or for other purposes. For instance, in some cases, it is advisable to use a high molecular weight polyol having a high hydrophobic nature such as a hydroxyl group-containing polybutadiene to reduce the hydrophilic nature of a polyurethane urea elastomer. As such a high molecular weight polyol, a polyol having an average molecular weight per hydroxyl group of at least 400, particularly at least 800, an average number of hydroxyl groups per molecule of from 1.6 to 4 is preferred. The average molecular weight per hydroxyl group is preferably at most 4000. Such a high molecular weight polyor may be, for example, a hydroxyl group-containing hydrocarbon polymer such as a hydroxyl group-containing polybutadiene, a polyester polyol or a polyoxytetramethylene polyol.

The high molecular weight active hydrogen compound component (A) comprises a combination of the above-mentioned polyoxyalkylene polyol (a-1) and the high molecular weight amine (a-2) and may optionally contain other high molecular weight polyol (a-3). The amount of the high molecular weight amine (a-2) is preferably determined by the proportion of amino groups. Namely, the number of amino groups is required to be from 2 to 55% based on the total number of active hydrogen-containing groups in the constituents (a-1), (a-2) and (a-3). The proportion of amino groups is preferably from 5 to 45%, more preferably from 5 to 40%. When the high molecular weight amine (a-2) has a relatively high proportion of amino groups, this proportion of amino groups corresponds substantially to from 2 to 50% by weight of the constituent (a-2) based on the total amount of the constituents (a-1), (a-2) and (a-3). This proportion is preferably from 5 to 45% by weight, more preferably from 5 to 40% by weight. The proportion of the high molecular weight polyol (a-3) as the optional component is preferably from 0 to 30% by weight, more preferably from 0 to 20% by weight, based on the total amount of the constituents (a-1), (a-2) and (a-3). The proportion of the polyoxyalkylene polyol (a-1) is preferably from 50 to 98% by weight, more preferably from 60 to 95% by weight, based on the total amount of the constituents (a-1), (a-2) and (a-3).

The low molecular weight polyol (b-1) in the present invention is a low molecular weight polyol having from 2 to 4 hydroxyl groups and a molecular weight of at most 400. This constituent (b-1) includes typical chain extenders such as ethylene glycol and 1,4-butanediol. Further, it includes trihydric alcohols other than mentioned above, low molecular weight polyoxyalkylene polyols and polyols havng no amino group such as polyols having tertiary amino groups. These low molecular weight polyols may be used alone or in combination as a mixture of two or more. The constient (b-1) includes, for example, ethylene glycol 1,-butanediol, neopentyl glycol, 1,6-hexanediol, diethylene glycol, triethylene glycol, dipropylene glycol, triethanolamine, an N-alkyldiethanolamine and a bisphenol A-alkylene oxide adduct, but it is not restricted to these specific examples. Preferably, at least one of ethylene glycol and 1,4-butanediol is used.

The diamine (b-2) in the present invention is at least one member selected from the group consisting of aromatic compounds and alicyclic compounds, which contains no amino group directly bonded to an aromatic ring and which has two primary amino groups. The aromatic compound is a compound having two aminoalkyl groups having a primary amino group. The alicyclic compound is a compound having two groups selected from the group consisting of primary amino groups and aminoalkyl groups having a primary amino group. These aminoalkyl groups are preferably $C_1$-$C_3$ aminoalkyl groups. The ring of such an aromatic compound or an alicyclic compound may further have at least one substituent such as an alkyl group or an electron attractive group. A preferred aromatic compound is a benzene derivative, and a preferred alicyclic compound is a cyclohexane derivative. The molecular weight of these diamines (b-2) is preferably at most 400. Further, these diamines (b-2) may be used in combination as a mixture of two or more.

As the aminoalkyl group in the above diamine (b-2), an aminomethyl group is particularly preferred. Other amino alkyl groups include, for example, a 2-aminoethyl group, a 1-aminoethyl group, a 1-amino-1-methylethyl group, a 2-amino-1-methylethyl group, a 3-aminopropyl group, a 2-aminopropyl group, a 1-aminopropyl group and 2-amino-2-methylpropyl group. When two aminoalkyl groups are present in one molecule, these aminoalkyl groups may be different. However, usually such two aminoalkyl groups are the same aminoalkyl groups. The substituent which may be present other than the primary amino group and the aminoalkyl group includes an alkyl group having at most 6 carbon atoms, a cycloalkyl group and an electron attractive group such as a hydrogen atom, a nitro group, a cyano group or an alkoxycarbonyl group. Particularly preferred substituents are an alkyl group having at most 4 carbon atoms and an electron attractive group selected from a chlorine atom and a nitro group. When such substituents are present, it is preferred that from 1 to 4 alkyl groups are attached to the ring and one electron attractive group is attached to the ring. However, a more preferred diamine (b-2) is a compound containing no such an electron attractive group.

Particularly preferred diamines (b-2) are a benzene derivative having two aminoalkyl groups as the sole substituents, i.e. bis(aminoalkyl)benzene and a cyclohexane derivative having two aminoalkyl groups as the sole substituents i.e. bis(aminoalkyl)cyclohexane. Among them, the cyclohexane derivative is preferred. Next preferred diamines (b-2) are cyclohexane derivatives having one amino alkyl group and one primary amino group. Specific compounds for the constituent (b-2) will be given below, but the constituent (b-2) is not restricted to such specific compounds. Namely, the constituent (b-2) includes, for example, bis(aminomethyl)cyclohexane, bis(1-amino-1-methyl)cyclohexane, bis(aminomethyl)benzene, bis(1-amino-1-methyl)benzene, isophorondiamine, diaminocyclohexane and bis(aminocyclohexyl)methane.

The chain extender (b-3) other than the above constituents (b-1) and (b-2) in the present invention is a compound having from 2 to 4 active hydrogen-containing groups and a molecular weight of at most 400. This constituent (b-3) may be a combination of two or more such chain extenders. The constituent (b-3) is preferably an aromatic diamine having two primary amino groups bonded to the aromatic ring. Further, it may be an aromatic polyamine other than this aromatic diamine, an alicyclic polyamine or a primary or secondary alkanolamine. The aromatic diamine is preferably an aromatic diamine having at least one substituent selected from the group consisting of an alkyl group, a cycloalkyl group, an alkoxy group, an alkylthio group and an electron attractive group on the aromatic ring to which the amino groups are bonded. Particularly preferred is a diamino benzene derivative. Except for the electron attractive group, the above-mentioned substituents are preferably attached in a plurality of 2 to 4 to the aromatic ring to which amino groups are attached. It is particularly preferred that they are attached at at least one, preferably all, of the ortho positions to the positions where the amino groups are attached. In the case of an electron attractive group, one or two electron attractive groups are preferably attached to the aromatic ring to which the amino groups are attached. Of course, other substituents may be attached to the aromatic ring to which the electron attractive group is attached. The carbon number of the alkyl group, an alkoxy group and an alkylthio group is preferably at most 4, and the cycloalkyl group is preferably a cyclohexyl group. As the electron attractive group, a halogen atom, a trihaloethyl group, a nitro group, a cyano group or an alkoxycarbonyl group is preferred. Particularly preferred is a chlorine atom, a trifluoromethyl group or a nitro group. The aliphatic polyamine is preferably a diamino alkane having at most 6 carbon atoms or a polyalkylene polyamine. The alkanolamine is preferably a monoalkanolamine or a dialkanolamine.

Specific examples of the chain extender (b-3) include, for example, 1-methyl-3,5-diethyl-2,4 (or 2,6)-diaminobenzene, monochloro-p-diaminobenzene, 1-methyl-3,5-dimethylthio-2,4 (or 2,6)-diaminobenzene, 1-trifluoromethyl-3,5-diaminobenzene, 1-trifluoromethyl-4-chloro-3,5-diaminobenzene, 2,4-toluenediamine, 2,6-toluenediamine, bis(3,5-dimethyl-4-aminophenyl)methane, 4,4'-diaminodiphenylmethane, ethylenediamine, 1,6-diaminohexane, mono ethanolamine and diethanolamine. However, the chain extender (b-3) is not restricted to such specific examples. Particularly preferred are diamino benzene derivatives such as diethyltoluene diamine (i.e. one of or a mixture of 1-methyl-3,5-diethyl-2,4 (or 2,6-)-diaminobenzene), dimethylthiotoluene diamine, monochloro diaminobenzene and trifluoromethyl diaminobenzene.

The chain extender component (B) comprises a combination of the above-mentioned low molecular weight polyol (b-1) and the above-mentioned diamine (b-2) and may further optionally contain the above-mentioned chain extender (b-3). With respect to the proportions of the constituents, the component (B) comprises from 55 to 98% by weight, preferably from 70 to 98% by weight, of the constituent (b-1), from 2 to 35% by weight, preferably from 2 to 30% by weight, of the constituent (b-2) and from 0 to 40% by weight, preferably from 0 to 20% by weight, of the constituent (b-3). Further, the proportion of the constituent (b-2) is preferably higher than the proportion of the constituent (b-3). Namely, the proportion of the constituent (b-2) to the total amount of the constituents (b-2) and (b-3) is preferably from 50 to 100% by weight, more preferably from 70 to 100% by weight. When the constituent (b-3) is used, the lower limit is preferably at least 1% by weight, more preferably at least 5% by weight, based on the total amount of the constituents (b-1), (b-2) and (b-3).

The amount of the chain extender component (B) is from 5 to 45% by weight, preferably from 10 to 35% by weight, based on the total amount of the high molecular weight active hydrogen compound component (A) and the chain extender component (B). In order to improve the heat resistance and hardness of the elastomer, a relatively large amount of the chain extender is employed. In such a case, the amount of the chain extender component (B) is preferably from 15 to 35% by weight. In order to produce an elastomer having an excellent property such as elongation, the amount of the chain extender component (B) is preferably from 10 to 25% by weight.

The polyisocyanate compound component (C) comprises at least one compound having at least two isocyanate groups. It is preferred to employ an aromatic polyisocyanate. Specifically, the component (C) includes, for example, diphenylmethane diisocyanate, polymethylenepolyphenyl isocyanate, tolylene diisocyanate and modified products thereof. It is preferred to employ a liquid modified product of 4,4'-diphenylmethane diisocyanate. The modified product includes, for example, a prepolymer type modified product and a carbodiimide type modified product. The polyisocyanate compound preferably has an isocyanate group content of at least 12% by weight, more preferably at least 18% by weight. The polyisocyanate compound component (C) is used in an amount of from 0.8 to 1.3 times in equivalent relative to the total equivalent of the high molecular weight active hydrogen compound component (A) and the chain extender component (B). The amount is preferably from 0.9 to 1.2 times in equivalent.

For the production of a polyurethane urea elastomer, it is usually essential to use a catalyst. As such a catalyst, it is usual to employ a tertiary amine catalyst or an organic tin compound. Further, a foaming agent is used in many cases to improve the packing properties of the reactive mixture to the mold cavity. A polyurethane urea elastomer obtainable by using a relatively small amount of the foaming agent is called a microcellular (polyurethane urea) elastomer. The foaming agent includes, for example, trichlorofluoroethane, methylene chloride, other haloganated hydrocarbon foaming agents and water. Not infrequently, both are used together. It is particularly preferred to use a halogenated hydrocarbon foaming agent, and the amount is usually at most about 15 parts by weight, preferably from about 2 to about 10 parts by weight, per 100 parts by weight of the high molecular weight active hydrogen compound component (A).

The production of a polyurethane urea elastomer may be conducted by using optical additives in addition to the above-mentioned starting materials. Such optional additives include, for example, fillers, coloring agents, ultraviolet absorbers, light stabilizers, antioxidants and flame retardants. The fillers include inorganic fibers such as glass fibers and wallastnite, organic fibers such as synthetic fibers, calcium carbonate and other powder fillers, mica and other flat-shaped fillers. If these fillers are incorporated in large amounts, there will be problems with respect to the viscosity or handling efficiency of the starting material components. Therefore, the amount of such fillers is usually at most about 30% by weight, preferably at most 20% by weight, based on the total amount of the synthetic resin starting materials. These additives are incorporated mainly to the starting material component containing the active hydrogen compounds. However, it is also possible to incorporate them to the starting material component containing the isocyanate compound.

The shaped product of the polyurethane urea elastomer obtained by the present invention may be used for various purposes. It is particularly suitable for exterior parts of automobiles such as exterior shell structures of bumpers, fenders or door panels. However, the application is not limited to such specific examples, and the shaped product is useful also for other automobile parts, housings of electric or electronic appliances and other applications.

Now, the present invention will be described in further detail with reference to Examples. However, it should be understood that the present invention is by no means restricted by these specific Examples.

The following starting materials and molding tests were employed in the subsequent Examples.

(I) High molecular weight active hydrogen compound component (A)
  (1) Polyoxyalkylene polyol (a-1)
    (a-1-1): a mixture of the same amounts by weight of a polyoxypropyleneoxyethylenetriol having a hydroxyl value of 28 with glycerol as the initiator and having terminal oxyethylene groups with an oxyethylene group content of 20% by weight and a polyoxypropyleneoxyethylenediol having a hydroxyl value of 28 with the propylene glycol as the initiator and having terminal oxyethylene groups with an oxyethylene group content of 20% by weight.
  (2) High molecular weight amine (a-2)
    (a-2-1): a polyoxypropylene diamine having a molecular weight of 2000 obtained by converting about 90% of hydroxyl groups of a polyoxypropylenediol to primary amino groups.
    (a-2-2): a polyoxypropylene diamine having a molecular weight of 4000 obtained by converting about 90% of hydroxyl groups of a polyoxypropylenediol to primary amino groups.
    (a-2-3): a polyoxypropylene triamine having a molecular weight of 3000 obtained by converting about 90% of hydroxyl groups of a polyoxypropylenetriol to primary amino groups.
    (a-2-4): a polyoxypropylene triamine having a molecular weight of 5000 obtained by converting about 90% of hydroxyl groups of a polyoxypropylenetriol to primary amino groups.

(II) Chain extender component (B)
  (1) Low molecular weight polyol (b-1)
    (b-1-1): ethylene glycol
    (b-1-2): 1,4-butanediol
  (2) Diamine (b-2)
    (b-2-1): 1,3-bis(aminomethyl)benzene
    (b-2-2): 1,3-bis(aminomethyl)cyclohexane
    (b-2-3): isophorone diamine
    (b-2-4): 1,4-diaminocyclohexane
    (b-2-5): bis(4-aminocyclohexyl)methane
  (3) Other chain extender (b-3)
    (b-3-1): a mixture of isomers comprising 1-methyl-3,5-diethyl-2,4-diaminobenzene and 1-methyl-3,5-diethyl-2,6-diaminobenzene.
    (b-3-2): monochloro-1,4-diaminobenzene
    (b-3-3): a mixture of isomers comprising 1-methyl-3,5-dimethylthio- 2,4-diaminobenzene and 1-methyl-3,5-dimethylthio- 2,6-diaminobenzene
    (b-3-4): 1-trifluoromethyl-4-chloro-3,5-diaminobenzene
    (b-3-5): 1-trifluoromethyl-3,5-diaminobenzene (III) Polyisocyanate compound component (C)
A prepolymer type modified diphenylmethane having a isocyanate content of 26.0% by weight. The diisocyanate component is used in an amount of 1.05 by equivalent ratio to the active hydrogen component.

(IV) Other components
Catalysts:
  DBTDL: dibutyltin dilaurate
  TEDA: triethylenediamine solution ("DABCO 33LV")
Foaming agent:
  R-11: trichlorofluoromethane Molding Test By means of a reactive injection molding apparatus (high pressure foaming machine), reaction injection molding was conducted at an injection output of 150 kg/cm$^2$ and with a discharge amount of 15±5 kg/min by adjusting the liquid temperatures of the respective components to a level of from 30° to 40° C.

A mixture of all the above-mentioned starting material components as identified in Table 1 other than the polyisocyanate compound component (C) and 3 parts by weight of R-11, and the polyisocyanate compound component (C) were introduced into the respective starting material tanks of the reactive injection molding apparatus, and the two were mixed in such proportions to bring the isocyanate index to 105 and then injected. Here, the isocyanate index means 100 times of the equivalent amount of the isocyanate compound to one equivalent of the total active hydrogen compounds.

As the first mold, a mold having a cavity of 350×350×3 mm was used, and the gate was a film gate. The mold temperature was adjusted to a level of from 60° to 70° C., and the reaction injection molding was conducted. The shaped product obtained was after-cured at 120° C. for one hour, and the physical properties of the elastomer were measured. The measuring methods were as follows.

Tensile Tests

The 50% modulus (kg/cm$^2$), the tensile strength (kg/cm$^2$) and the elongation (%) were measured by using No. 2 dumbbell under a condition of a tensile rate of 250 mm/min.

Molding was conducted by using a second mold, whereby the degree of the formation of voids was measured. The cavity of the second mold was 350×80×10 mm, and a pin gate was provided at the center of the surface of 350×10 mm. This mold had a structure whereby voids were quite likely to form. The mold temperature was adjusted to a level of from 60° to 70° C., and the reaction injection molding was conducted. The degree of voids formed on the surface and in the interior of the elastomer obtained was visually examined and evaluated on the basis of the following 4 standards.

◎: no or little voids observed (the same degree as usual highly active system)
  ○: small amount of voids
  △: many voids
  X: very many voids (the same degree as usual low activity system)

The test results are shown in Table 1. The amounts of the starting materials in the Table are all represented by parts by weight (as mentioned above, 3 parts by weight of R-11 was used in addition to those identified in the Table).

TABLE 1

| | Test Nos. | | 1 | 2 | 3 | 4 | 5 | 6 | 7 | 8 | 9 |
|---|---|---|---|---|---|---|---|---|---|---|---|
| Starting materials | Polyoxyalkylene polyol (a-1-1) | Amount | 52 | 54 | 69 | 64 | 74 | 51.5 | 64 | 54 | 52 |
| | High molecular weight amine (a-2) | Type | (a-2-1) | (a-2-2) | (a-2-3) | (a-2-4) | (a-2-5) | (a-2-6) | (a-2-3) | (a-2-4) | (a-2-2) |
| | | Amount | 30 | 30 | 15 | 20 | 10 | 30 | 20 | 30 | 30 |
| | Polyol chain extender (b-1) | Type | BD | EG | EG | EG | EG | BD | EG | EG | EG |
| | | Amount | 16 | 13 | 14 | 13 | 14 | 17 | 15 | 15 | 16.5 |
| | Diamine chain extender (b-2) | Type | (b-2-1) | (b-2-1) | (b-2-1) | (b-2-1) | (b-2-2) | (b-2-2) | (b-2-2) | (b-2-2) | (b-2-5) |
| | | Amount | 2.0 | 3.0 | 2.0 | 3.0 | 2.0 | 1.5 | 1.0 | 1.0 | 1.5 |
| | Other chain extender (b-3) | Type | — | — | — | — | — | — | — | — | — |
| | | Amount | — | — | — | — | — | — | — | — | — |
| | Catalyst DBTDL | Amount | 0.1 | 0.1 | 0.1 | 0.1 | 0.1 | 0.1 | 0.1 | 0.1 | 0.1 |
| | Catalyst TEDA | Amount | 0.3 | 0.3 | 0.3 | 0.3 | 0.3 | 0.3 | 0.3 | 0.3 | 0.3 |
| Physical properties | Modulus | [kg/cm$^2$] | 125 | 125 | 130 | 135 | 135 | 130 | 140 | 140 | 135 |
| | Tensile strength | [kg/cm$^2$] | 290 | 280 | 260 | 300 | 250 | 270 | 275 | 290 | 280 |
| | Elongation | [%] | 300 | 270 | 250 | 290 | 250 | 310 | 255 | 300 | 290 |
| | Voids | | ○ | ◎ | ○ | ◎ | ○ | ◎ | ○ | ◎ | ○ |

| | Test Nos. | | 10 | 11 | 12 | 13 | 14 | 15 | 16 | 17 | 18 |
|---|---|---|---|---|---|---|---|---|---|---|---|
| Starting materials | Polyoxyalkylene polyol (a-1-1) | Amount | 74 | 69 | 74 | 79 | 64.5 | 69 | 69 | 65.9 | 70 |
| | High molecular weight amine (a-2) | Type | (a-2-3) | (a-2-4) | (a-2-1) | (a-2-1) | (a-2-2) | (a-2-4) | (a-2-4) | (a-2-2) | (a-2-4) |
| | | Amount | 10 | 15 | 10 | 5 | 20 | 15 | 15 | 20 | 15 |
| | Polyol chain extender (b-1) | Type | EG | EG | EG | EG | EG | EG | EG | EG | EG |
| | | Amount | 14 | 15 | 14 | 13 | 13 | 10.5 | 13 | 13.5 | 11 |
| | Diamine chain extender (b-2) | Type | (b-2-1) | (b-2-3) | (b-2-2) | (b-2-2) | (b-2-2) | (b-2-2) | (b-2-2) | (b-2-2) | (b-2-1) |
| | | Amount | 2.0 | 1.0 | 2.0 | 3.0 | 2.0 | 4.0 | 1.0 | 0.5 | 3.0 |
| | Other chain extender (b-3) | Type | — | — | (b-3-2) | (b-3-2) | (b-3-2) | (b-3-2) | (b-3-2) | (b-3-1) | (b-3-1) |
| | | Amount | — | — | 0.3 | 1.0 | 0.5 | 1.5 | 0.2 | 0.1 | 1.0 |
| | Catalyst DBTDL | Amount | 0.1 | 0.1 | 0.1 | 0.1 | 0.1 | 0.1 | 0.1 | 0.1 | 0.1 |
| | Catalyst TEDA | Amount | 0.3 | 0.3 | 0.3 | — | 0.2 | | 0.3 | 0.3 | 0.3 |
| Physical properties | Modulus | [kg/cm$^2$] | 145 | 145 | 140 | 135 | 135 | 125 | 135 | 135 | 130 |
| | Tensile strength | [kg/cm$^2$] | 250 | 270 | 230 | 240 | 290 | 280 | 285 | 290 | 280 |
| | Elongation | [%] | 240 | 250 | 240 | 230 | 295 | 285 | 300 | 290 | 285 |
| | Voids | | △ | ○ | ○ | ○ | ◎ | ◎ | ◎ | ◎ | ◎ |

| | Test Nos. | | 19 | 20 | 21 | 22 | 23 | 24 |
|---|---|---|---|---|---|---|---|---|
| Starting materials | Polyoxyalkylene polyol (a-1-1) | Amount | 69 | 76 | 79 | 81 | 77 | 84 |
| | High molecular weight amine (a-2) | Type | (a-2-4) | (a-2-4) | (a-2-4) | (a-2-4) | — | — |
| | | Amount | 15 | 8 | 5 | 5 | — | — |
| | Polyol chain extender (b-1) | Type | EG | EG | EG | EG | — | EG |
| | | Amount | 13.5 | 10 | 10.5 | 12 | — | 16 |
| | Diamine chain extender (b-2) | Type | (b-2-2) | (b-2-1) | (b-2-1) | (b-2-2) | — | — |
| | | Amount | 1.5 | 4 | 3 | 2 | — | — |
| | Other chain extender (b-3) | Type | (b-3-1) | (b-3-3) | (b-3-4) | (b-3-5) | (b-3-1) | — |
| | | Amount | 1.0 | 2 | 2.5 | 2 | 23 | — |
| | Catalyst DBTDL | Amount | 0.1 | 0.1 | 0.1 | 0.1 | 0.1 | 0.1 |
| | Catalyst TEDA | Amount | 0.3 | 0.2 | 0.3 | 0.3 | — | 0.3 |
| Physical properties | Modulus | [kg/cm$^2$] | 130 | 130 | 130 | 135 | 140 | 140 |
| | Tensile strength | [kg/cm$^2$] | 285 | 270 | 285 | 285 | 290 | 200 |
| | Elongation | [%] | 295 | 280 | 290 | 295 | 310 | 220 |
| | Voids | | ◎ | ◎ | ◎ | ◎ | ◎ | X |

What is claimed is:

1. A process for producing a non-cellular or microcellular polyurethane elastomer by reaction injection molding by using a high molecular weight active hydrogen compound component (A), a chain extender component (B) and a polyisocyanate compound component (C) as starting materials, wherein the component (A) is used in an amount of from 55 to 95% by weight based on the total amount by weight of the components (A and (B), the component (B) is used in an amount of from 5 to 45% by weight based on the total amount by weight of the components (A) and (B), and the component (C) is used in an amount of from 0.8 to 1.3 times in equivalent relative to the total equivalent of the components (A) and (B), and wherein (I) said high molecular weight active hydrogen compound component (A) comprises (1) at least one polyoxyalkylene polyol (a-1) having an average molecular weight per hydroxyl group of from 800 to 4000 and an average number of hydroxyl groups per molecule of from 2 to 8 and containing at least 5% by weight of oxyethylene groups at the terminal portions of its molecules, (2) a high molecular weight amine (a-2) having from 2 to 8 active hydrogen containing groups selected from the group consisting of primary amino groups, secondary amino groups and hydroxyl groups, provided that at least one of the active hydrogen-containing groups is an amino group selected from the group consisting of primary amino groups and secondary amino groups, and an average molecular weight per active hydrogen-containing group of from 800 to 4000, and optionally (3) a high molecular weight polyol (a-3) other than the polyalkylene polyol (a-1), wherein the total number of the primary amino groups and the secondary amino groups is from 2 to 55% based on the total number of the active hydrogen-containing groups in the constituents (a-1), (a-2) and (a-3), and the constituent (a-3) is in an amount of from 0 to 30% by weight based on the total amount by weight of the constituents (a-1), (a-2) and (a-3); and (II) said chain extender component (B) comprises (1) a low molecular weight polyol (b-1) having from 2 to 4 hydroxyl groups and a molecular weight of at most 400, (2) at least one diamine (b-2) selected from aromatic and alicyclic compounds and having two primary amino groups and no amino group directly bonded to an aromatic ring, and optionally (3) a chain extender (b-3) other than the constituents (b-1) and (b-2), having from 2 to 4 active hydrogen-containing groups selected from the group consisting of primary amino groups, secondary amino groups and hydroxyl groups, and a molecular weight of at most 400, wherein the constituent (b-1) is in an amount of from 55 to 98% by weight based on the total amount by weight of the constituents (b-1), (b-2) and (b-3), the constituent (b-2) is in an amount of from 2 to 35% by weight based on the total amount by weight of the constituents (b-1), (b-2) and (b-3), and the constituent (b-3) is in an amount of from 0 to 40% by weight based on the total amount by weight of the constituents (b-1), (b-2) and (b-3).

2. The process according to claim 1, wherein the high molecular weight amine (a-2) is a high molecular weight amine having a polyoxyalkylene chain, obtained by converting a part or whole of the hydroxyl groups of a high molecular weight polyoxyalkylene polyol to primary amino groups or secondary amino groups.

3. The process according to claim 1, wherein the high molecular weight amine (a-2) has an average molecular weight per active hydrogen-containing group of from 1200 to 3500.

4. The process according to claim 1, wherein the proportion of the total number of the primary amino groups and the secondary amino groups to the total number of the active hydrogen-containing groups in the high molecular weight amine (a-2) is at least 70%.

5. The process according to claim 1, wherein the proportion of the total number of the primary amino groups and the secondary amino groups to the total number of the active hydrogen-containing groups in the high molecular weight active hydrogen compound component (A) is from 5 to 45%.

6. The process according to claim 1, wherein the diamine (b-2) is at least one compound selected from the group consisting of benzene derivatives and cyclohexane derivatives having two $C_1$-$C_3$ aminoalkyl groups.

7. The process according to claim 1, wherein the low molecular weight polyol (b-1) is at least one diol selected from the group consisting of ethylene glycol and 1,4-butanediol.

8. The process according to claim 1, wherein the chain extender (b-3) is a diaminobenzene derivative having at least one substituent selected from the group consisting of alkyl groups, alkylthio groups and electron attractive groups.

9. The process according to claim 1, wherein the chain extender component (B) comprises from 70 to 98% by weight of the constituent (b-1), from 2 to 30% by weight of the constituent (b-2) and from 0 to 20% by weight of the constituent (b-3), provided that the constituent (b-3) is smaller in the amount than the constituent (b-2).

10. The process according to claim 1, wherein the component (C) is at least one polyisocyanate compound selected from the group consisting of 4,4'-diphenylmethane isocyanate and its modified compounds, and its isocyanate group content is at least 12% by weight.

11. A composition for producing a non-cellular or microcellular polyurethane elastomer by reaction injection molding, which comprises from 55 to 95% by weight of a high molecular weight active hydrogen compound component (A) and from 5 to 45% by weight of a chain extender component (B), wherein (I) said high molecular weight active hydrogen compound component (A) comprises (1) at least one polyoxyalkylene polyol (a-1) having an average molecular weight per hydroxyl group of from 800 to 4000 and an average number of hydroxyl groups per molecule of from 2 to 8 and containing at least 5% by weight of oxyethylene groups at the terminal portions of its molecules, (2) a high molecular weight amine (a-2) having from 2 to 8 active hydrogen-containing groups selected from the group consisting of primary amino groups, secondary amino groups and hydroxyl groups, provided that at least one of the active hydrogen-containing groups is an amino group selected from the group consisting of primary amino groups and secondary amino groups, and an average molecular weight per active hydrogen-containing group of from 800 to 4000, and optionally (3) a high molecular weight polyol (a-3) other than the polyalkylene polyol (a-1), wherein the total number of the primary amino groups and the secondary amino groups is from 2 to 55% based on the total number of the active hydrogen-containing groups in the constituents (a-1), (a-2) and (a-3), and the constituent (a-3) is in an amount of from 0 to 30% by weight based on the total amount by weight of the constituents (a-1), (a-2) and (a-3); and (II) said chain extender component (B) comprises (1) a low molecular weight polyol (b-1) having from 2 to 4 hydroxyl groups and a molecular weight of at most 400, (2) at least one diamine (b-2) selected from aromatic and alicyclic compounds and having two primary amino groups and no amino group directly bonded to an aromatic ring, and optionally (3) a chain extender (b-3) other than the constituents (b-1) and (b-2), having from 2 to 4 active hydrogen-containing groups selected from the group consisting of primary amino groups, secondary amino groups and hydroxyl groups, and a molecular weight of at most 400, wherein the constituent (b-1) is in an amount of from 55 to 98% by weight based on the total amount by weight of the constituents (b-1), (b-2) and (b-3), the constituent (b-2) is in an amount of from 2 to 35% by weight based on the total amount by weight of the constituents (b-1), (b-2) and (b-3), and the constituent (b-3) is in an amount of from 0 to 40% by weight based on the total amount by weight of the constituents (b-1), (b-2) and (b-3).

12. The composition according to claim 11, wherein the high molecular weight amine (a-2) is a high molecular weight amine having a polyoxyalkylene chain, obtained by converting a part or whole of the hydroxyl groups of a high molecular weight polyoxyalkylene polyol to primary amino groups or secondary amino groups.

13. The composition according to claim 11, wherein the high molecular weight amine (a-2) has an average molecular weight per active hydrogen-containing group of from 1200 to 3500.

14. The composition according to claim 11, wherein the proportion of the total number of the primary amino groups and the secondary amino groups to the total number of the active hydrogen-containing groups in the high molecular weight amine (a-2) is at least 70%.

15. The composition according to claim 11, wherein the proportion of the total number of the primary amino groups and the secondary amino groups to the total number of the active hydrogen-containing groups in the high molecular weight active hydrogen compound component (A) is from 5 to 45%.

16. The composition according to claim 11, wherein the diamine (b-2) is at least one compound selected from the group consisting of benzene derivatives and cyclohexane derivatives having two $C_1$–$C_3$ aminoalkyl groups.

17. The composition according to claim 11, wherein the low molecular weight polyol (b-1) is at least one diol selected from the group consisting of ethylene glycol and 1,4-butanediol.

18. The composition according to claim 11, wherein the chain extender (b-3) is a diaminobenzene derivative having at least one substituent selected from the group consisting of alkyl groups, alkylthio groups and electron attractive groups.

19. The composition according to claim 11, wherein the chain extender component (B) comprises from 70 to 98% by weight of the constituent (b-1), from 2 to 30% by weight of the constituent (b-2) and from 0 to 20% by weight of the constituent (b-3), provided that the constituent (b-3) is smaller in the amount than the constituent (b-2).

20. The composition according to claim 11, wherein the component (C) is at least one polyisocyanate compound selected from the group consisting of 4,4'-diphenylmethane diisocyanate and its modified compounds, and its isocyanate group content is at least 12% by weight.

* * * * *